United States Patent [19]
Machida et al.

[11] Patent Number: 5,575,733
[45] Date of Patent: Nov. 19, 1996

[54] TOROIDAL TYPE CONTINUOUSLY VARIABLE TRANSMISSION HAVING RETAINER RING WITH LUBRICATING OIL PATHS

[75] Inventors: Hisashi Machida, Fujisawa; Tsutomu Abe, Chigasaki, both of Japan

[73] Assignee: NSK Ltd., Tokyo, Japan

[21] Appl. No.: 331,090

[22] Filed: Oct. 28, 1994

[30] Foreign Application Priority Data

Dec. 7, 1993 [JP] Japan .................................. 5-065285

[51] Int. Cl.$^6$ ........................................ F16H 15/38
[52] U.S. Cl. .................................. 476/40; 384/470
[58] Field of Search .......................... 476/40; 384/470, 384/614

[56] References Cited

U.S. PATENT DOCUMENTS

| | | | |
|---|---|---|---|
| 4,787,757 | 11/1988 | Finger | 384/470 |
| 4,915,515 | 4/1990 | Rohrer et al. | 384/470 X |
| 5,255,985 | 10/1993 | Alling | 384/470 X |
| 5,261,863 | 11/1993 | Jufuku et al. | 476/40 |
| 5,328,277 | 7/1994 | Moulton | 384/470 X |

*Primary Examiner*—Richard M. Lorence
*Assistant Examiner*—David Fenstermacher
*Attorney, Agent, or Firm*—Shapiro and Shapiro

[57] ABSTRACT

In order to prevent portions of a thrust rolling bearing from being worn significantly and being burned, grooves are formed on both inner and outer surfaces of a retainer so as to traverse pockets. Lubricating oil is supplied from oiling holes formed in an outer race toward the retainer. The lubricating oil supplied from the oiling holes flows through the grooves to the rolling bearing uniformly.

16 Claims, 8 Drawing Sheets

5,575,733

TOROIDAL TYPE CONTINUOUSLY VARIABLE TRANSMISSION HAVING RETAINER RING WITH LUBRICATING OIL PATHS

BACKGROUND OF THE INVENTION

1. Field of the Invention

The present invention relates to a toroidal type continuously variable transmission to be used for automobiles or various industrial machines.

2. Related Background Art

A toroidal type continuously variable transmission, as shown in FIGS. 14 and 15 has been studied for use in an automobile. This toroidal type continuously variable transmission has, as disclosed in, e.g., Japanese Utility Model Laid-Open Application No. 62-71465, an input shaft 1 and an output shaft 3. An input-side disk 2 is provided concentrically with the input shaft 1. An output-side disk 4 is fixed to an end portion of the output shaft 3. The inner surface of a casing containing the toroidal type continuously variable transmission or a supporting bracket mounted in the casing is provided with trunnions 6, 6 to be swung around axes 5, 5 located in diagonal positions with respect to the input and output shafts 1 and 3.

The trunnions 6, 6 are provided on outer surfaces of both end portions with the axes 5, 5. The center portions of the trunnions 6, 6 support the base portions of respective displacement axes (shafts) 7, 7. The inclinations of the displacement axes 7, 7 can be freely adjusted by swinging the respective trunnions 6, 6 around the axes 5, 5. Power rollers 8, 8 are supported rotatably around the displacement axes 7, 7 supported by the trunnions 6, 6. The power rollers 8, 8 are held tightly between the input-side and output-side disks 2 and 4.

Inner side surfaces 2a and 4a of the input-side and output-side disks 2 and 4 which oppose each other, have circular arc shapes in cross section with the axes 5, 5 as the centers. Spherically formed peripheral surfaces 8a, 8a of the power rollers 8, 8 are in contact with the inner side surfaces 2a and 4a.

A loading cam type pressing device 9 is provided between the input shaft 1 and the input-side disk 2. The input-side disk 2 is pressed elastically toward the output-side disk 4 by the pressing device 9. The pressing device 9 is constituted of a cam plate 10 that rotates together with the input shaft 1 and a plurality of rollers 12, 12 (e.g., four rollers) held by a retainer 11. One side surface of the cam plate 10 (left side surface in FIGS. 14 and 15) forms a cam surface 13 having irregularities in the circumferential direction. Also, an outer side surface of the input-side disk 2 (the right-side surface in FIGS. 14 and 15) forms a cam surface 14. The plurality of rollers 12, 12 are supported rotatably around axes in the radial directions with respect to the center of the input shaft 1.

In the above-structured toroidal type continuously variable transmission, when the cam plate 10 is rotated in accordance with rotation of the input shaft 1, the plurality of rollers 12, 12 are pressed by the cam surface 13 against the cam surface 14 of the input-side disk 2. As a result, as soon as the input-side disk 2 is pressed against the power rollers 8, 8 the input-side disk 2 is rotated due to the engagement of the cam surfaces 13, 14 and the plurality of rollers 12, 12. Then, the rotation of the input-side disk 2 is transmitted via the power rollers 8, 8 to the output-side disk 4, whereby the output shaft 3 fixed to the output-side disk 4 is rotated.

When changing the rotation speed between the input shaft 1 and the output shaft 3 by performing deceleration between the input shaft 1 and the output shaft 3, the trunnions 6, 6 are swung around the axes 5, 5 to incline the displacement axes 7, 7 such that the peripheral surfaces 8a, 8a of the power rollers 8, 8 are brought into contact with portions of the inner side surface 2a of the input-side disk 2 close to the center thereof and portions of the inner side surface 4a of the output-side disk 4 close to the outer periphery thereof, as shown in FIG. 14.

When performing acceleration, the trunnions 6, 6 are swung to incline the displacement axes 7, 7 such that the peripheral surfaces 8a, 8a of the power rollers 8, 8 are brought into contact with portions of the inner side surface 2a of the input-side disk 2 close to outer periphery thereof and into contact with portions of the inner side surface 4a of the output-side disk 4 close to the center thereof, as shown in FIG. 15. When the inclinations of the displacement axes 7, 7 are set so as to be between the positions shown in FIGS. 14 and 15, it is possible to obtain an intermediate speed ratio between the input shaft 1 and the output shaft 3.

Further, FIG. 16 shows a more detailed toroidal type continuously variable transmission for an automobile as disclosed in Japanese Utility Model Laid-Open Application No. 62-199557. The rotation of an engine is transmitted via a clutch 15 to an input shaft 16 to rotate the cam plate 10 connected to the intermediate portion of the input shaft 16 by the spline joint. Due to the operation of the pressing device 9, which includes the cam plate 10, the input-side disk 2 is rotated while being pressed toward the output-side disk 4 (the leftward direction in FIG. 16). The rotation of the input-side disk 2 is transmitted to the output-side disk 4 via the power rollers 8, 8.

The output-side disk 4 is supported by a needle bearing 17 around the input shaft 16. A cylindrical output shaft 18 formed integrally with the output-side disk 4 is supported by an angular type ball bearing 20 in a housing 19. One end of the input shaft 16 (right end in FIG. 16) is supported rotatably by a roller bearing 21 in the housing 19 and the other end thereof is supported rotatably via a sleeve 23, by an angular type ball bearing 22 in the housing 19.

A transmission gear 26 has a forward drive gear 24 and a rearward drive gear 25 formed integrally with the forward drive gear 24 and is connected to the outer peripheral surface of the output shaft 18 by the spline joint. When driving the automobile forward, the transmission gear 26 is moved rightward to engage the forward drive gear 24 directly with a forward drive coupling gear 28 provided on the intermediate portion of a take-out shaft 27. When driving the automobile rearward, the transmission gear 26 is moved leftward to engage the rearward drive gear 25 with a rearward drive coupling gear 29 fixed to the intermediate portion of the take-out shaft 27 via an intermediate gear (not shown).

In the above-structured toroidal type continuously variable transmission, when the input shaft 16 is rotated via the clutch 15 by the engine and the transmission gear 26 is shifted in a proper direction, it is possible to rotate the take-out shaft 27 in a desired direction. Also, when the trunnions 6, 6 are swung to change contact positions of the peripheral surfaces 8a, 8a of the power rollers 8, 8 and the inner side surfaces 2a, 4a of the respective input-side and output-side disks 2, 4, it is possible to change the rotation speed ratio of the take out shaft 27 to the input shaft 16.

During driving of the above-structured toroidal type continuously variable transmission, the input-side disk 2 is pressed toward the output-side disk 4 in accordance with the operation of the pressing device 9. As a result, a thrust load in the rightward direction in FIG. 16 is applied to the input shaft 16 supporting a cam plate 10 constituting the pressing device 9 as a force reactive to above pressure. This thrust load is supported by the ball bearing 22 via a nut 30 fastened on the end portion of the input shaft 16 and the sleeve 23. Also, due to the operation of the pressing device 9, a thrust load in the leftward direction in FIG. 16 is applied to the output shaft 18 via the input-side and output-side disks 2, 4 and the power rollers 8, 8. This thrust load is supported by the ball bearing 20 via a stop ring 33 fitted on the output shaft 18.

In FIG. 16, reference numerals 31 and 32 designate a clutch for an engine brake and a clutch for direct connection, respectively. The structures and operations of these are disclosed in detail in Japanese Utility Model Laid-Open Application No. 62-199557 and are irrelevant to the point of the present invention, so the detailed description thereof is omitted.

Further, during driving of the above toroidal type continuously variable transmission, in addition to the thrust loads applied to the input and output shafts 16 and 18, thrust loads are applied to the power rollers 8, 8. Therefore, thrust rolling bearings 34, 34 are provided between the power rollers 8, 8 and the respective trunnions 6, 6 to support the thrust loads applied to the respective power rollers 8, 8.

each of the thrust rolling bearings 34, 34 has a plurality of rolling elements 35, 35, a retainer 36 for holding the rolling elements 35, 35 rotatably and an outer race 37. The plurality of rolling elements 35, 35 are formed of bearing steel or ceramic in the shape of a ball or a taper roller. These rolling elements 35, 35 are in contact with a raceway surface formed on the outer end surface of each power roller 8, 8 and a raceway surface formed on one side surface of each outer race 37, 37. The retainer 36 is formed of metal 6r plastics like a disk and holds the rolling elements 35, 35 rotatably in pockets 38, 38, one per pocket. The pockets 38, 38 are formed in the retainer 36 in an intermediate portion in the radial direction at regular intervals in the circumferential direction. The outer races 37, 37 are formed of bearing metal or ceramic in the shape of a disk and are brought into contact with the inner side surfaces of the respective trunnions 6, 6 via spacers 39, 39 (refer to FIG. 17) formed in the shape of a disk too.

During driving of the toroidal type continuously variable transmission, the thrust rolling bearings 34, 34 rotate at high speed while supporting thrust loads applied to the power rollers 8, 8. Therefore, during that time, it is necessary to supply a sufficient amount of lubricating oil to the thrust rolling bearings 34, 34.

Therefore, as shown in FIG. 17, one or a plurality of oiling holes 40, 40 are formed in the outer race 37 and lubricating oil is supplied through the oiling holes 40, 40 forcibly. The lubricating oil supplied forcibly through the oiling holes 40, 40 flows through the space between the inner surface of the outer race 37 and the outer surface of the retainer 36 and the space between the inner surface of the retainer 36 and the outer end surface of the power roller 8 to lubricate rolling portions of the rolling elements 35, 35.

When supplying lubricating oil to the above-structured thrust rolling bearings 34, 34, it is conceivable that the supply of lubricating oil could become partially deficient. That is, as shown in FIG. 18A, when the retainer 36 is located midway between the inner surface of the outer race 37 and the outer end surface of the power roller 8, the lubricating oil flows through both the space between the inner surface of the outer race 37 and the outer surface of the retainer 36 and the space between the inner surface of the retainer 36 and the outer end surface of the power roller 8, causing no problem.

However, when the lubricating oil is poured through the oiling holes 40, 40 formed in the outer race 37 toward the outer surface of the retainer 36, the retainer 36 is pressed by the flow of the lubricating oil and is liable to be displaced toward the power roller 8, as shown in FIG. 18B. When the inner surface of the retainer 36 is brought into contact with the outer end surface of the power roller 8 owing to such displacement, a sufficient amount of lubricating oil cannot be applied to contact portions of the raceway surface formed on this outer end surface and rolling contact surfaces of the rolling elements 35.

As a result, abrasion loss becomes large at the Contact portions of the raceway surface of the outer end surface of the power roller 8 and the rolling contact surfaces of the rolling elements 35. Also, in an extreme case, the contact portions might be burned.

SUMMARY OF THE INVENTION

It is an object of the present invention to provide a toroidal type continuously variable transmission whose durability and reliability are enhanced.

A toroidal type continuously variable transmission may, like the conventional toroidal type continuously variable transmission, have a shaft, first and second disks which are supported rotatably around the shaft and whose respective inner side surfaces are positioned in opposition to each other, a trunnion to be swung around an axis located in a diagonal position with respect to respective central axes of the first and second disks, a displacement axis mounted on said trunnion, a power roller held tightly between the first and second disks while supported rotatably around the displacement axis and a thrust rolling bearing provided between the power roller and the trunnion to support a load applied to said power roller in a thrust direction. The respective inner side surfaces of the first and second disks is in the shape of a circular arc in section. The peripheral surface of the power roller is in the shape of a sphere and is in contact with the inner side surfaces of the first and second disks. Further, the thrust rolling bearing is provided with a plurality of rolling elements and a retainer for holding the plurality of rolling elements rotatably.

Particularly, in the toroidal type continuously variable transmission of the present invention, the retainer comprises a disk-shaped main body, a plurality of pockets formed in an intermediate portion of the main body in the radial direction thereof so as to hold the respective rolling elements rotatably therein, and a plurality of lubricating oil paths provided between inner and outer peripheries of the main body so as to traverse the pockets.

Operating in a similar manner to the conventional toroidal type continuously variable transmission, the above-structured toroidal type continuously variable transmission of the present invention transmits rotational force between the shaft and the rotation transmitting member and changes a rotation speed ratio between the shaft and the rotation transmitting member.

According to the toroidal type continuously variable transmission of the present invention, even though the retainer is displaced in the axial direction to cause one surface of the retainer to be brought into contact with a surface in opposition to this surface of the retainer, a sufficient amount of lubricating oil can flow via the lubricating oil paths into the pocket holding the rolling elements. As a result, it is possible to reduce the danger that portions of the thrust rolling bearing are worn significantly or burned.

DETAILED DESCRIPTION OF THE PREFERRED EMBODIMENTS

Figure 1:
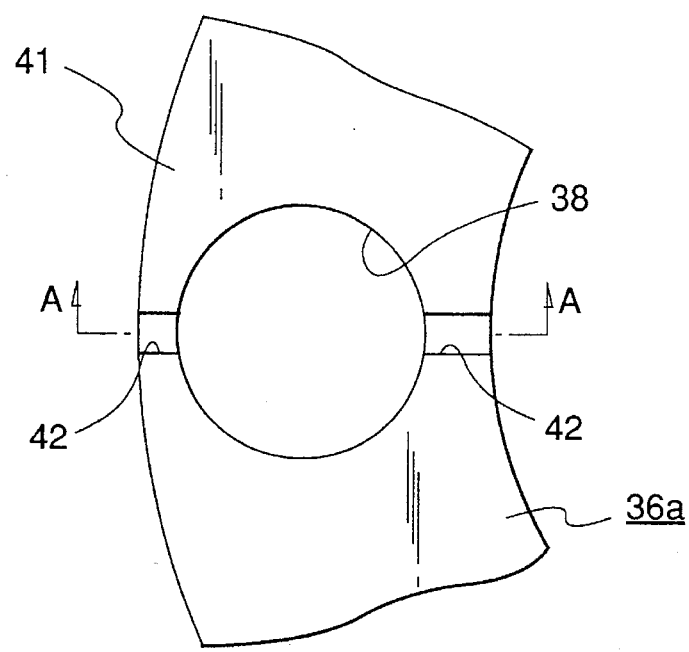
FIG. 1 is a plan view showing a portion of a retainer according to a first embodiment of the present invention.
Figure 2:
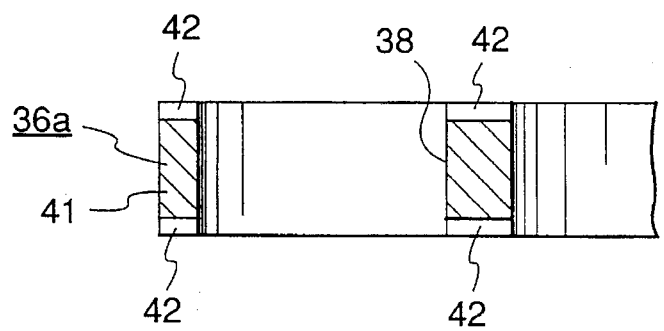
FIG. 2 is a sectional view taken along line A—A of FIG. 1.
Figure 3:
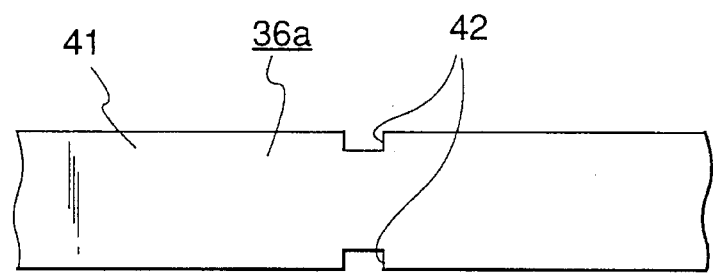
FIG. 3 is a view observed from the right side in FIG. 2.

FIGS. 1 to 4 show a first embodiment of the present invention. A characteristic of a toroidal type continuously variable transmission of the present invention is to enhance lubricity of a thrust rolling bearing 34a for supporting a thrust load applied to the power roller 8 and the other structures and operations are the same as those in the prior art. Therefore, the description of the overlapping portion will be omitted and mainly the characteristic portion of the present invention will be described.

A main body 41 of a retainer 36a is formed of plastics or metal such as copper in the shape of a disk. The main body 41 is provided with pockets 38 in an intermediate portion in the radial direction at regular intervals in the circumferential direction so as to match the shape of the rolling element 35. Also, both inner and outer surfaces of the main body 41 are formed in the radial direction with grooves 42, 42 so as to provide paths that traverse respective pockets 38. In this embodiment, these grooves 42, 42 constitute lubricating oil paths provided between the inner and outer peripheries of the main body.

Figure 4:
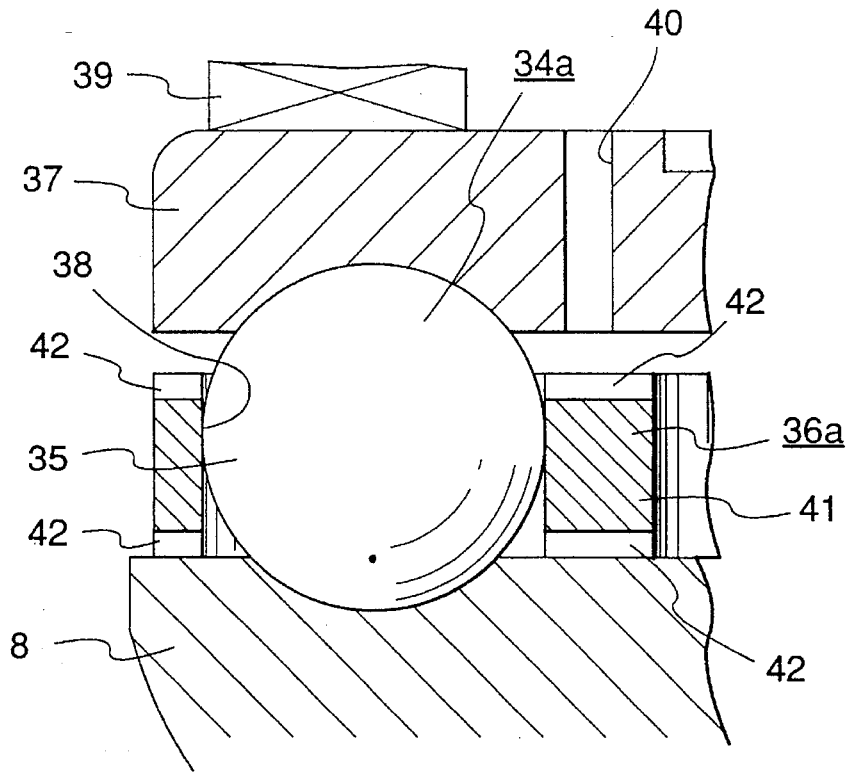
FIG. 4 is a sectional view showing a portion of a thrust rolling bearing with the retainer in FIGS. 1 to 3 incorporated therein, corresponding to portion B shown in FIG. 17.
Figure 5:
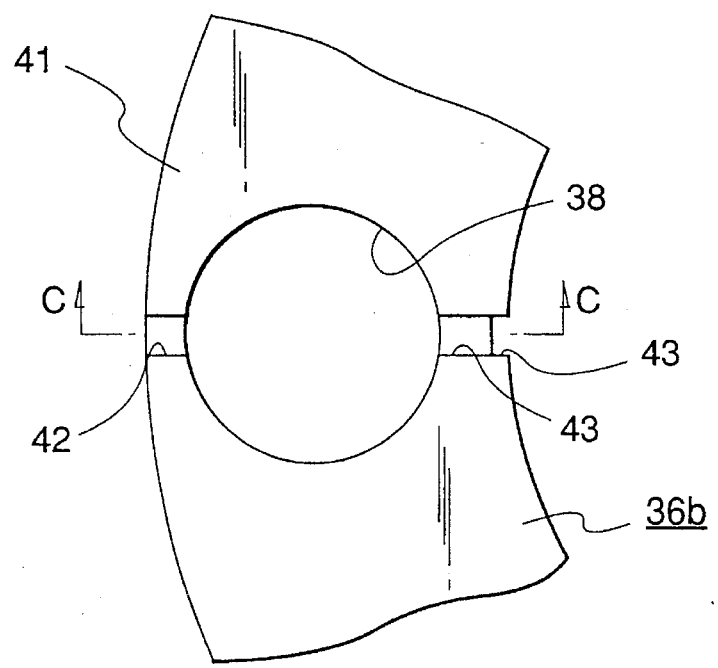
FIG. 5 is a plan view showing a portion of a retainer according to a second embodiment of the present invention.
Figure 6:
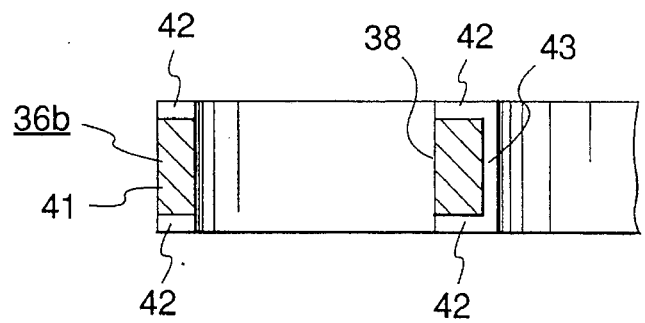
FIG. 6 is a sectional view taken along line C—C of FIG. 5.
Figure 7:
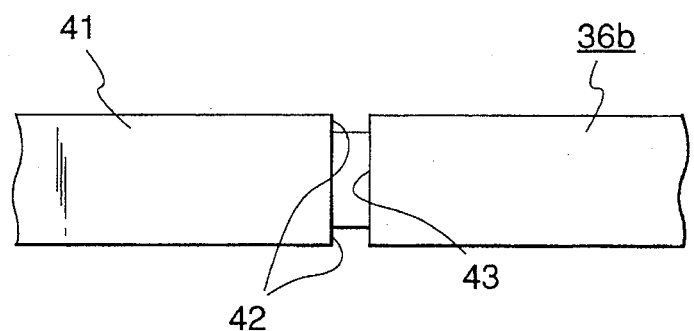
FIG. 7 is a view observed from the right side in FIG. 6.
Figure 8:
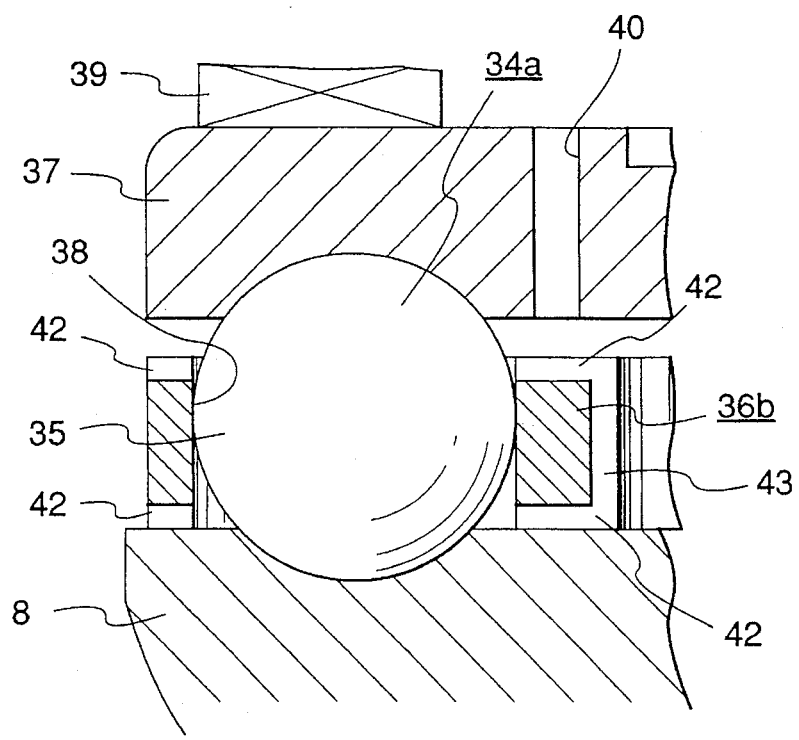
FIG. 8 is a sectional view showing a portion of a thrust rolling bearing with a retainer of FIGS. 5 to 7 incorporated therein, corresponding to the portion B shown in FIG. 17.

In the above-structured toroidal type continuously variable transmission, even though, due to the force of lubricating oil emitted from the oiling holes 40 formed in the outer race 37, the retainer 36a constituting the thrust rolling bearing 34a is displaced in the axial direction to cause the inner surface of the retainer 36a to be brought into contact with the outer end surface of the power roller 8, as shown in FIG. 4, a sufficient amount of lubricating oil flows through the grooves 42, 42 associated with the pockets 38 supporting the rolling elements 35.

As a result, the lubricating oil at the contact portions of the raceway surface formed on the outer end surface of the power roller 8 and the rolling contact surface of the rolling elements 35 will not become deficient. Therefore, it is possible to reduce the danger that the thrust rolling bearing 34a is worn significantly or is burned.

FIGS. 5 to 8 show a second embodiment of the present invention. In this embodiment, a cutout 43 is formed at a portion of the inner periphery of the main body 41 constituting a retainer 36b which meets end portions of the grooves 42, 42 formed on the inner and outer surfaces of the main body 41. The lubricating oil emitted from the oiling holes 40 of the outer race 37 flows via the cutout 43 to the inner surface of the main body 41 smoothly. Therefore, it is possible to impart a sufficient amount of lubricating oil to the contact portion of the raceway surface formed on the outer end surface of the power roller 8 and the rolling contact surface of the rolling element 35.

Figure 9:
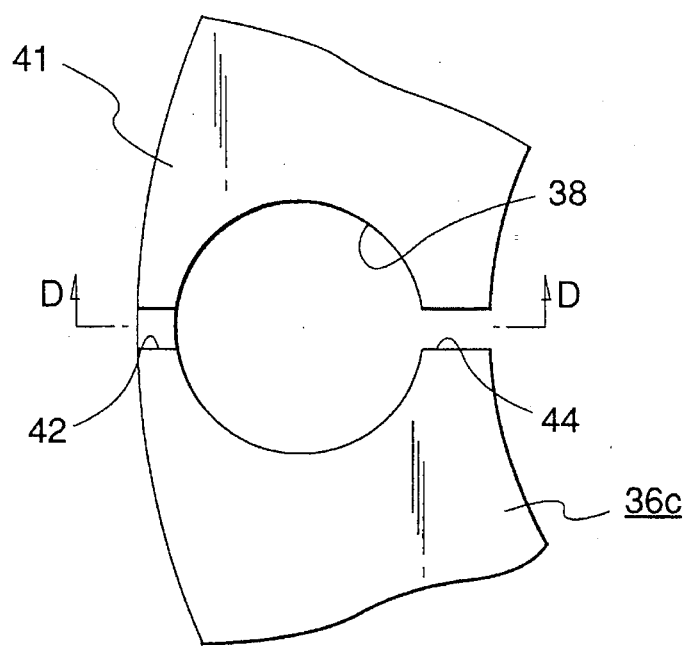
FIG. 9 is a plan view showing a portion of a retainer according to a third embodiment of the present invention.
Figure 10:
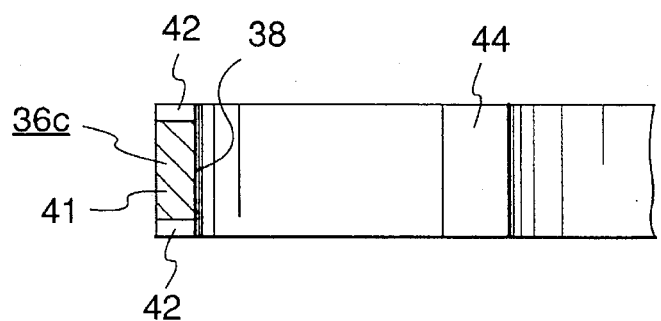
FIG. 10 is a sectional view taken along line D—D of FIG. 9.
Figure 11:
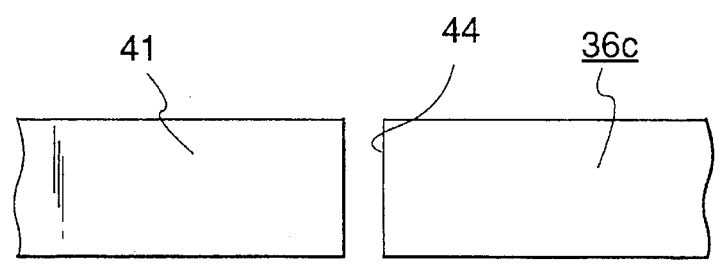
FIG. 11 is a view observed from the right side of FIG. 10.

FIGS. 9 to 11 show a third embodiment of the present invention. In this embodiment, a slit 44 is formed at a portion of the inner periphery of the main body 41 constituting a retainer 36c closest to the pocket 38 so as to connect the pocket 38 and the inner periphery of the main body 41. This slit 44 serves as a portion of a lubricating oil path. At a portion of the outer periphery of the main body 41 closest to the pocket 38 are formed the grooves 42, 42 constituting the left portion of the lubricating oil path. Also, in this embodiment, the lubricating oil emitted from the oiling hole 40 of the outer race 37 is directed to the inner surface of the main body 41 smoothly. Therefore, it is possible to supply a sufficient amount of lubricating oil to the contact portion of the raceway formed on the outer end surface of the power roller 8 and the rolling contact surface of the rolling element 35.

Figure 12:
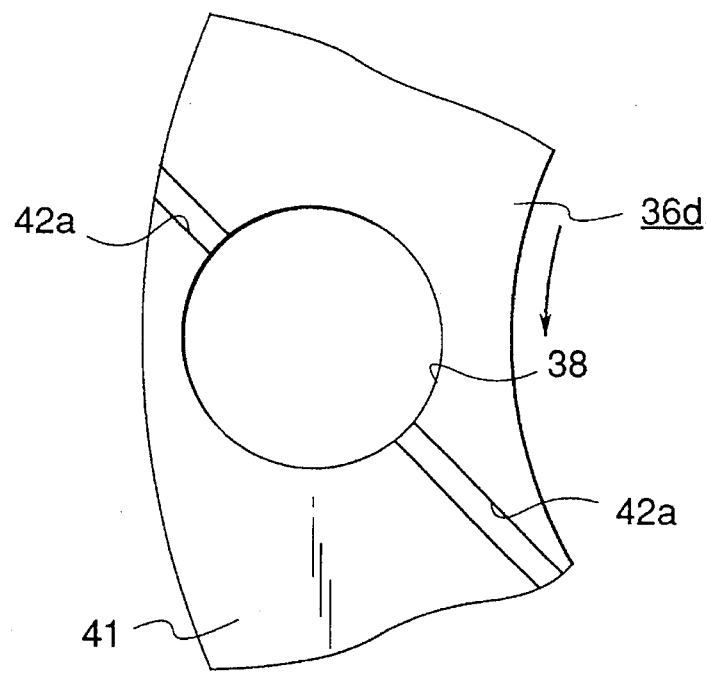
FIG. 12 is a plan view showing a portion of a retainer according to a fourth embodiment of the present invention.

FIG. 12 shows a fourth embodiment of the present invention. In this embodiment, the inner and outer surfaces of the main body 41 constituting a retainer 36d are formed with grooves 42a, 42a which are inclined with respect to the radial direction. During normal driving of a toroidal type continuously variable transmission (in the case of a transmission for an automobile, forward driving of the automobile), the retainer 36d is rotated in a direction as indicated by the arrow in FIG. 12 to cause the groove 42a to rake in the lubricating oil on the side of the inner diameter of the main body 41. Therefore, it is possible to supply a sufficient amount of lubricating oil to the inside portion of the thrust rolling bearing.

Figure 13:
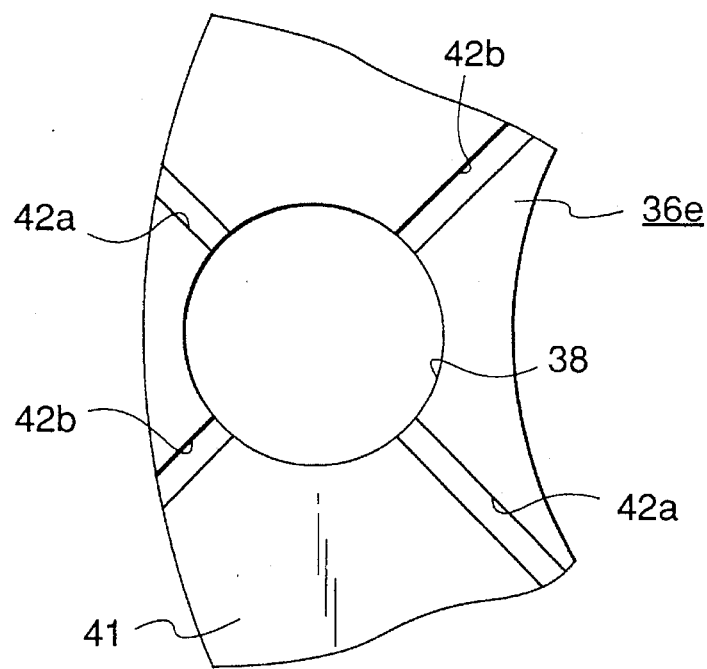
FIG. 13 is a plan view showing a portion of a retainer according to a fifth embodiment of the present invention.
Figure 14:
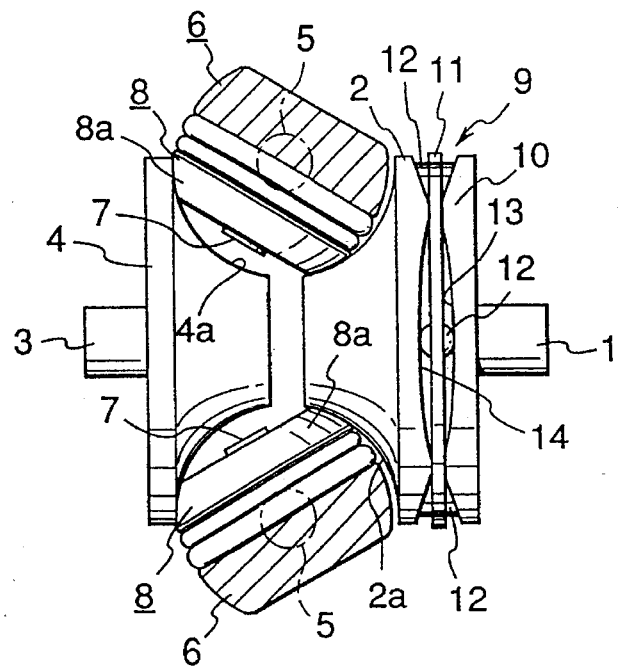
FIG. 14 is a side view showing the basic structure of a conventional toroidal type continuously variable transmission in a maximum deceleration state.
Figure 15:
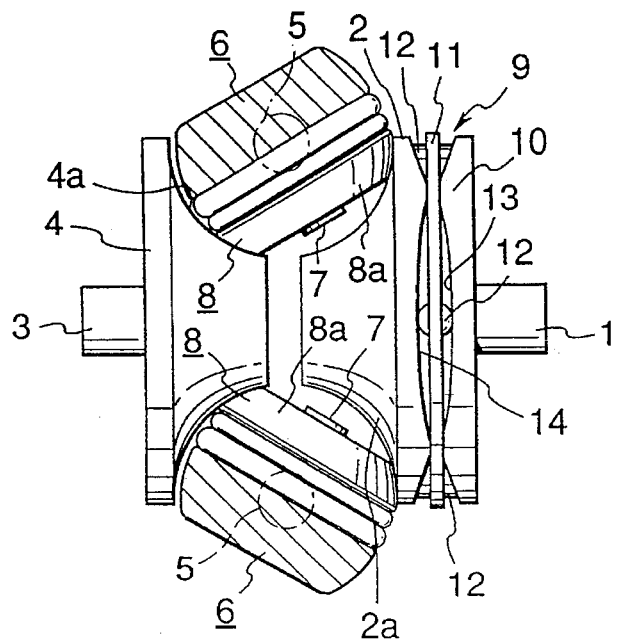
FIG. 15 is a side view showing the basic structure of the conventional toroidal type continuously variable transmission in a maximum acceleration state.
Figure 16:
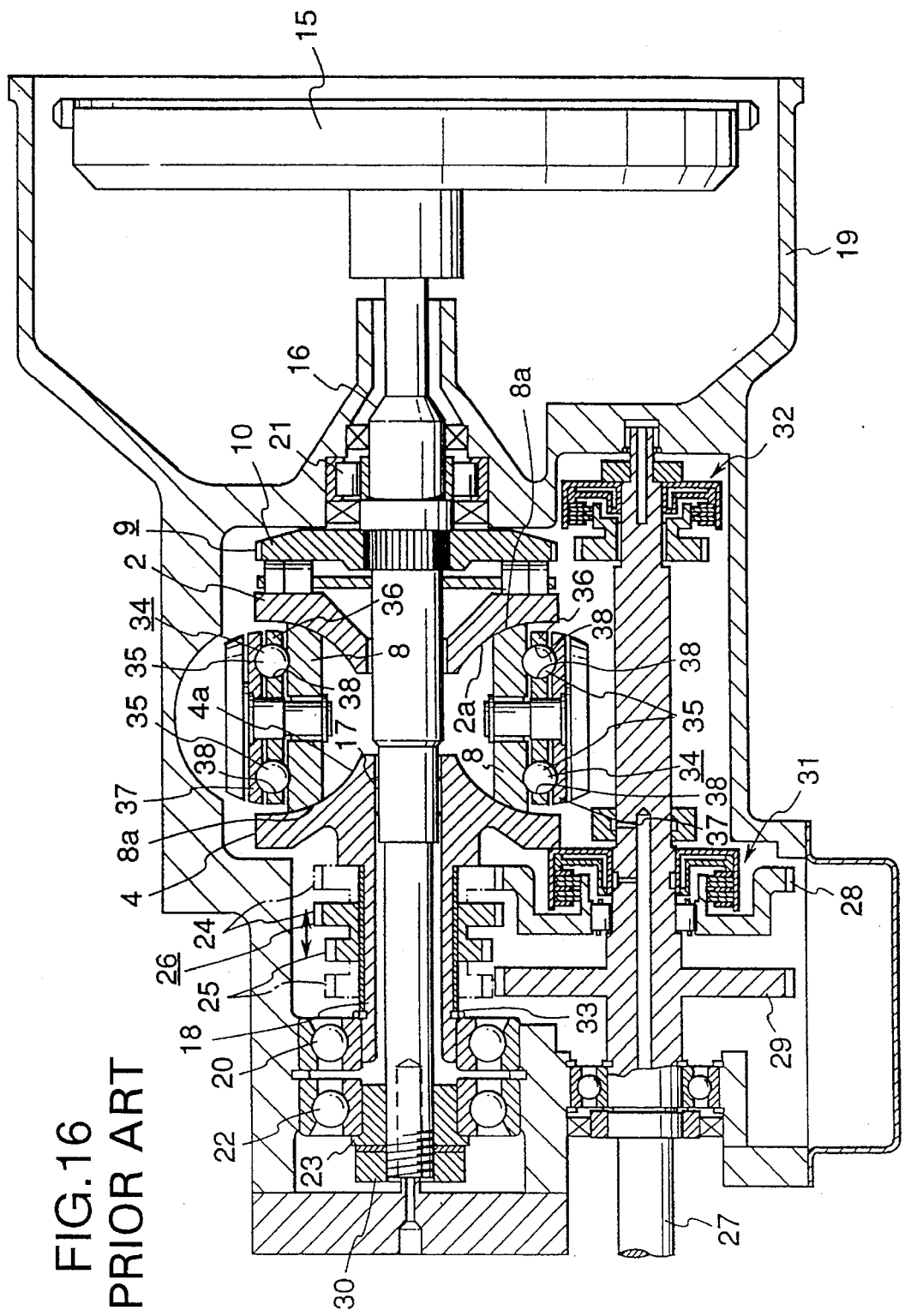
FIG. 16 is a sectional view showing a concrete example of the construction of a conventional toroidal type continuously variable transmission.
Figure 17:
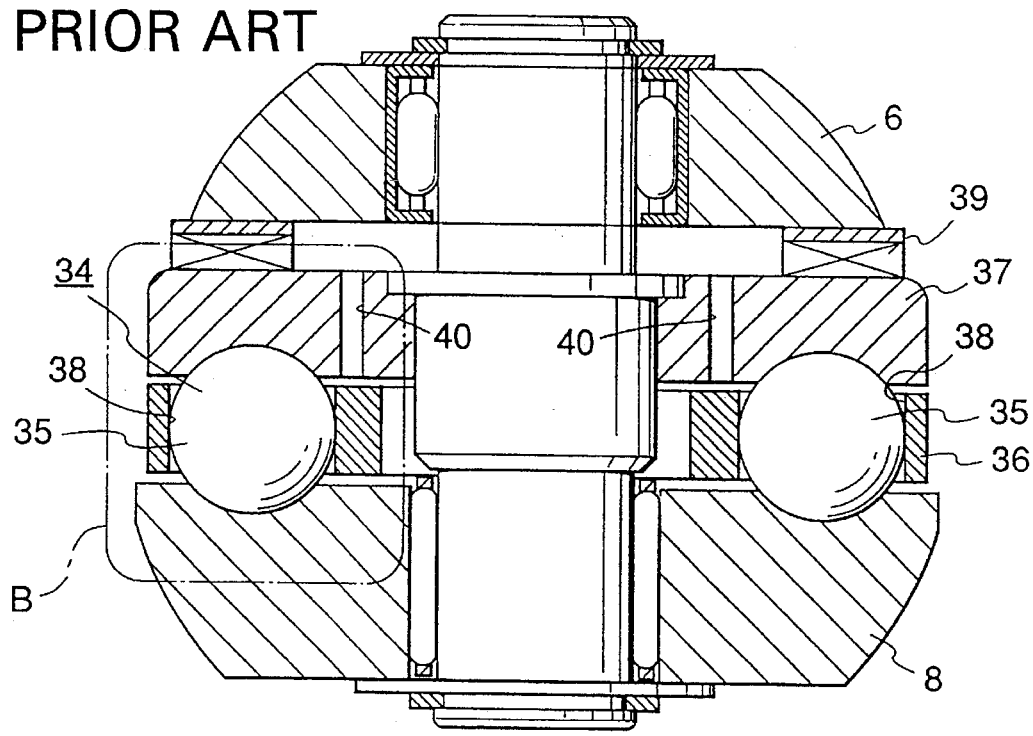
FIG. 17 is a sectional view showing the thrust rolling bearing and the lubricating device of FIG. 16.
Figure 18A:
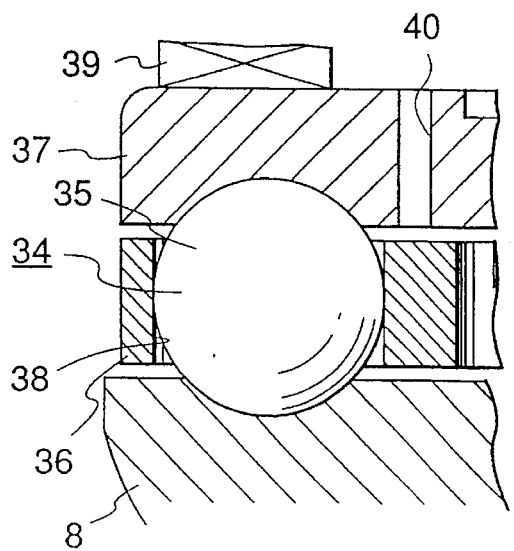
FIG. 18A is an enlarged view showing the portion B of FIG. 17, wherein lubrication can be performed by the lubricating device.
Figure 18B:
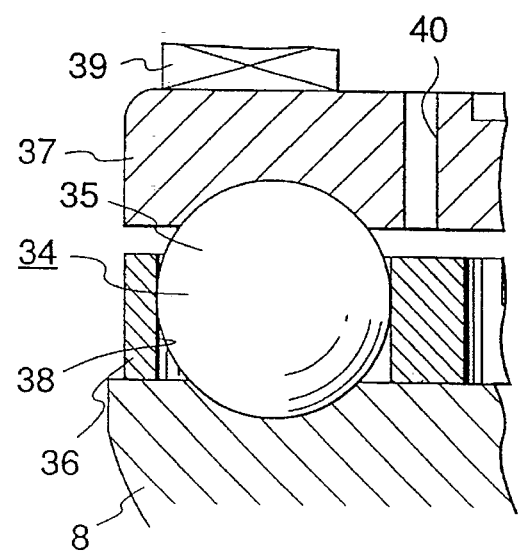
FIG. 18B is an enlarged view showing the portion B of FIG. 17, wherein failure of lubrication occurs.

FIG. 13 shows a fifth embodiment of the present invention. In this embodiment, the inner and outer surfaces of the main body 41 constituting a retainer 36e are formed with grooves 42a, 42b which are inclined with respect to the radial direction of the main body 41 in opposite directions to each other. Therefore, when the toroidal type continuously variable transmission is driven in either direction, one of the grooves 42a, 42b rakes in the lubricating oil on the side of the inner diameter of the main body 41. As a result, it is possible to supply a sufficient amount of lubricating oil to the inside portion of the thrust rolling bearing regardless of the driving direction.

According to the toroidal type continuously variable transmission as structured and operated above, it is possible to enhance lubricity of the thrust rolling bearing attached to the power roller, contributing to reliability and durability of the toroidal type continuously variable transmission with the thrust rolling bearing incorporated therein.

What is claimed is:

1. A toroidal type continuously variable transmission comprising:

a shaft;

first and second disks which are supported rotatably around said shaft and have respective inner side surfaces in opposition to each other, each of said inner side surfaces having a cross section substantially in the shape of a circular arc;

a trunnion swingable around an axis transverse to respective central axes of said first and second disks;

a displacement shaft mounted on said trunnion;

a power roller disposed between said first and second disks and rotatably supported by said displacement shaft, a peripheral surface of said power roller being substantially in the shape of a portion of a sphere and being in contact with said inner side surfaces of said first and second disks; and a thrust rolling bearing provided between said power roller and said trunnion to support a load applied to said power roller in a thrust direction, said thrust rolling bearing including a plurality of rolling elements and a retainer for rotatably holding said plurality of rolling elements, wherein said retainer comprises a substantially disk-shaped main body, a plurality of pockets formed in a radially intermediate portion of said main body and holding said rolling elements rotatably therein, and a plurality of lubricating oil paths extending between radially inner and outer peripheries of said main body so as to traverse respective pockets.

2. A toroidal type continuously variable transmission according to claim 1, wherein lubricating oil is supplied to said lubricating oil paths in a direction in which the lubricating oil pushes the retainer axially.

3. A toroidal type continuously variable transmission according to claim 1, wherein at least one of said lubricating oil paths extends radially of said retainer.

4. A toroidal type continuously variable transmission according to claim 1, wherein at least one of said lubricating oil paths extends obliquely with respect to a radius of said retainer.

5. A toroidal type continuously variable transmission according to claim 1, wherein at least one of said lubricating oil paths includes a groove that extends between a periphery of one of said pockets and one of said inner and outer peripheries of the main body.

6. A toroidal type continuously variable transmission according to claim 5, wherein said groove extends to said inner periphery of the main body.

7. A toroidal type continuously variable transmission according to claim 5, wherein said groove extends radially of said retainer.

8. A toroidal type continuously variable transmission according to claim 5, wherein said groove extends obliquely with respect to a radius of said retainer.

9. A toroidal type continuously variable transmission comprising:

first and second disks that have respective inner side surfaces in opposition to each other;

a trunnion swingable around an axis transverse to respective central axes of said first and second disks;

a power roller disposed between said first and second disks, a peripheral surface of said power roller being in contact with said inner side surfaces of said first and second disks; and a thrust rolling bearing provided between said power roller and said trunnion to support a load applied to said power roller in a thrust direction, said thrust rolling bearing including a plurality of rolling elements and a retainer for rotatably holding said plurality of rolling elements, wherein said retainer comprises a substantially disk-shaped main body, a plurality of pockets formed in a radially intermediate portion of said main body and holding said rolling elements rotatably therein, and a plurality of lubricating oil paths extending between radially inner and outer peripheries of said main body so as to traverse respective pockets.

10. A toroidal type continuously variable transmission according to claim 9, wherein lubricating oil is supplied to said lubricating oil paths in a direction in which the lubricating oil pushes the retainer axially.

11. A toroidal type continuously variable transmission according to claim 9, wherein at least one of said lubricating oil paths extends radially of said retainer.

12. A toroidal type continuously variable transmission according to claim 9, wherein at least one of said lubricating oil paths extends obliquely with respect to a radius of said retainer.

13. A toroidal type continuously variable transmission according to claim 9, wherein at least one of said lubricating oil paths includes a groove that extends between a periphery of at least one of said pockets and one of said inner and outer peripheries of the main body.

14. A toroidal type continuously variable transmission according to claim 13, wherein said groove extends to said inner periphery of the main body.

15. A toroidal type continuously variable transmission according to claim 13, wherein said groove extends radially of said retainer.

16. A toroidal type continuously variable transmission according to claim 13, wherein said groove extends obliquely with respect to a radius of said retainer.

* * * * *